US008364971B2

(12) United States Patent
Bell et al.

(10) Patent No.: US 8,364,971 B2
(45) Date of Patent: Jan. 29, 2013

(54) USER AUTHENTICATION SYSTEM AND METHOD (75) Inventors: Robert E. Bell, Severna Park, MD (US);
Robert S. Winsor, Round Hill, VA (US);
Aaron R. Metzger, Reston, VA (US);
Aaron H. Krebs, Carlisle, PA (US);
Richard M. G. Dynes, Fredericksburg, VA (US)

(73) Assignee: Kynen LLC, Reston, VA (US)

( * ) Notice: Subject to any disclaimer, the term of this patent is extended or adjusted under 35 U.S.C. 154(b) by 389 days.

(21) Appl. No.: 12/713,276

(22) Filed: Feb. 26, 2010

(65) Prior Publication Data

US 2010/0299530 A1 Nov. 25, 2010

Related U.S. Application Data (60) Provisional application No. 61/155,582, filed on Feb. 26, 2009.

(51) Int. Cl.
*G06F 21/00* (2006.01)
*G06F 11/30* (2006.01)
*G06F 12/14* (2006.01)
*G06K 9/00* (2006.01)
(52) U.S. Cl. ............ 713/186; 713/187; 726/26; 726/27; 726/28; 726/29; 726/30; 382/117; 382/118
(58) Field of Classification Search ................. 713/186, 713/187; 382/117, 118; 726/26–30
See application file for complete search history.

(56) References Cited

U.S. PATENT DOCUMENTS

| 4,109,237 | A | 8/1978 | Hill |
| 4,641,349 | A | 2/1987 | Flom et al. |
| 6,377,699 | B1 | 4/2002 | Musgrave et al. |
| 6,532,298 | B1 | 3/2003 | Cambier et al. |
| 6,810,480 | B1 * | 10/2004 | Parker et al. ................... 713/186 |
| 6,819,219 | B1 * | 11/2004 | Bolle et al. .................... 340/5.52 |
| 6,829,384 | B2 | 12/2004 | Schneiderman et al. |
| 7,088,220 | B2 | 8/2006 | Kotzin |
| 7,233,684 | B2 | 6/2007 | Fedorovskaya |
| 7,234,156 | B2 | 6/2007 | French et al. |
| 7,444,007 | B2 * | 10/2008 | Schonberg et al. ........... 382/117 |
| 2002/0010857 | A1 * | 1/2002 | Karthik ......................... 713/168 |
| 2002/0112177 | A1 * | 8/2002 | Voltmer et al. ............... 713/200 |
| 2002/0158750 | A1 * | 10/2002 | Almalik ....................... 340/5.83 |
| 2005/0129286 | A1 * | 6/2005 | Hekimian ..................... 382/117 |
| 2005/0152583 | A1 | 7/2005 | Kondo et al. |
| 2006/0120707 | A1 | 6/2006 | Kusakari et al. |
| 2006/0274919 | A1 | 12/2006 | Loiacono et al. |

(Continued)

OTHER PUBLICATIONS

M. Kanematsu, H. Takano, K. Nakamura, "Highly Reliable Liveness Detection Method for Iris Recognition," SICE Annual Conference 2007, Kagawa University, Japan (2007).

*Primary Examiner* — Catherine Thiaw
(74) *Attorney, Agent, or Firm* — 24IP Law Group; Timothy R. DeWitt (57) ABSTRACT A high security computer system and method that authenticates a user using iris recognition and liveliness detection. The method for authenticating the user to the secure system includes capturing an image of the user's face and generating an iris template from the image. While the iris template is being generated, liveliness verification is performed on the user's face. User access is granted if the iris template matches the enrolled iris template and if the liveness verification demonstrates the user's face is live, and denied if otherwise. The method may optionally silently re-authenticate the user after access is granted to the secure system. The authentication system includes an image capture device for capturing an image, an iris template generation component to generate an iris template from the image, a liveness detection component, and an iris comparison component adapted to compare the iris template to iris templates of previously enrolled users.

16 Claims, 5 Drawing Sheets

U.S. PATENT DOCUMENTS

| | | |
|---|---|---|
| 2006/0282671 A1 | 12/2006 | Burton |
| 2006/0288234 A1* | 12/2006 | Azar et al. ............... 713/186 |
| 2007/0110285 A1* | 5/2007 | Hanna et al. ............. 382/117 |
| 2007/0250411 A1* | 10/2007 | Williams .................... 705/28 |
| 2008/0104415 A1* | 5/2008 | Palti-Wasserman et al. . 713/186 |
| 2008/0181467 A1 | 7/2008 | Zappia |
| 2008/0282334 A1 | 11/2008 | Yves et al. |
| 2009/0048978 A1 | 2/2009 | Ginter |
| 2009/0175509 A1 | 7/2009 | Gonion et al. |
| 2010/0110374 A1* | 5/2010 | Raguin et al. ............. 351/206 |
| 2010/0138668 A1* | 6/2010 | Tsuria et al. .............. 713/186 |
| 2010/0161488 A1* | 6/2010 | Evans et al. ................ 705/44 |
| 2012/0213418 A1* | 8/2012 | Tosa et al. ................ 382/117 |

* cited by examiner

USER AUTHENTICATION SYSTEM AND METHOD

CROSS-REFERENCE TO RELATED APPLICATIONS

The present application claims the benefit of the filing date of U.S. Provisional Patent Application Ser. No. 61/155,582 filed by the present inventors on Feb. 26, 2009.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

1. Field of the Invention

The present invention relates generally to user authentication systems and methods and more specifically to biometric-based user authentication systems and methods.

2. Brief Description of the Related Art

Methods and devices for authenticating users of various types of devices have become increasingly important. An example of such a method and device is disclosed in U.S. Pat. No. 7,234,156. Many such devices and methods have incorporated or used biometric authentication, such as fingerprint, facial image, iris, and other biometric information. For example, U.S. Patent Application Publication No. 2009/0175509 discloses system and method for personal computing device control using face detection and recognition. As another example, U.S. Pat. No. 7,088,220 discloses a system and method using biometric sensors for controlling access to a wireless communication device. Still other references, such as U.S. Pat. Nos. 7,233,684 and 6,829,384 disclose systems and methods for identifying objects in images. While these prior systems may have been useful in certain environments, a need exists for faster, more accurate, and more reliable authentication systems and methods.

SUMMARY OF THE INVENTION

In an embodiment, the present invention is directed to a high security computer system sign-on method and system that authenticates the user to the secure system by capturing an image of the user's face and generating a template or a plurality of iris templates of both of the user's eyes from the image. The iris template(s) is/are compared to an encrypted database of previously enrolled iris templates. Liveness verification is performed on the user's face to ensure the iris is live, thus thwarting spoof attempts. Access to the secure system is denied if the iris template(s) does/do not match any previously enrolled iris templates or if the iris is not live. The method may optionally re-authenticate the user after access is granted to the secure system. The re-authentication may be performed passively on the users such that the user is unaware that re-authentication is being performed. If this is not effective, the user may be prompted to look at the imaging device for 1-2 seconds such that a proper capture of the user's face may be performed.

In a preferred embodiment, the present invention is a method for authenticating a user to a secure system. The method is comprised of the steps of capturing an image comprising an eye of a user, generating an iris template from the image, performing liveness verification on a eye of the user, comparing the generated iris template to an enrolled iris template, granting the user access to the secure system if the generated iris template matches the enrolled iris template and if the liveness verification demonstrates the eye of the user is live, denying the user access to the secure system if the generated iris template does not match the enrolled iris template, and denying the user access to the secure system if the liveness verification demonstrates the eye of the user.

The method may further comprise periodically re-authenticating the user after access is granted. The re-authenticating the user is performed silently on the user, or, the user may be given notice when re-authentication occurs. The re-authentication ay comprise the steps of capturing a subsequent image comprising an eye of a user, generating a subsequent iris template from the subsequent image, performing subsequent liveness verification on the user, maintaining access to the secure system if the subsequent iris template matches the enrolled iris template and if the subsequent liveness verification demonstrates the eye of the user is live, denying the user access to the secure system if the subsequent iris template does not match the enrolled iris template and denying the user access to the secure system if the subsequent liveness verification demonstrates the user is not live. The method may further comprise any or all of the steps of activating an iris authentication system, requiring the user to provide additional identifying credentials, or requiring the user to swipe a smart identification card, the smart identification card securely storing and providing the at least one enrolled iris template.

The method may also comprise the steps of capturing multiple images of the user's face, the multiple images comprising real and false positive captures of the user's face, and discarding the false positive captures during the step of generating the iris template, thus eliminating the generation of any actual false positive captures and using one of the real positive captures to generate the iris template. Still further, if both irises pass the quality check, the method may generate the first iris template, and if either iris fails to pass the quality check, the method may return to the step of performing a quality check.

The method may further comprise repeating the steps of granting a user access to a secure system after the occurrence of a predetermined event, for example expiration of a predetermined period of time. Also, the method of authenticating a user may be limited to a predetermined number of consecutive failed attempts, after which access to the secure system is temporarily locked.

The step of performing liveness verification may further comprise the steps of capturing a series of images of an eye of a user at different illuminations determining whether the series of images demonstrate a live iris, denying access to the secure system if the series of images do not demonstrate a live iris, and granting access to the secure system if the series of images demonstrate a live iris. The step of generating an iris template from the image may be performed in some embodiments only if the series of images demonstrates a live iris.

The step of generating the iris template from the first image may further comprise identifying the user's face in the first image, identifying the user's eyes in the first image, if no face or eyes are identified in the first image, returning to the capturing step, segmenting left and right eyes from the image, performing a quality check on irises of the segmented eyes, if one or both irises pass the quality check, generating the iris template, and if each of the irises fails the quality check, returning to the step of performing a quality check.

The step of generating the iris template may comprise the steps of if both irises pass the quality check, generating the iris template, and if either iris fails to pass the quality check, returning to the step of performing a quality check.

The step of generating an iris template may be performed, for example, on a server system or a client system.

The step of returning to the capturing step if no eyes are identified in the image further comprises displaying a message to a user.

The system in an embodiment of the invention comprises an image capture device for capturing an image of the user's face and an iris template generation component that generates an iris template from the image. The image capture device may employ infrared ("IR") illumination and autofocus to improve image capture. The system also has a liveness detection component for verifying the iris and live thwarting spoof attempts and an iris comparison component for securely comparing the iris template to iris templates of previously enrolled users. The system may optionally have a re-authentication component to re-authenticate the user after access is granted to the secure system.

The system may be adapted to run on a dedicated authentication device or thin client system. This provides improved scalability due to on-board template generation resulting in comparatively low I/O bandwidth requirements. While this embodiment works well with on-device and thin client systems, the invention may be adapted to other system arrangements such as client/server architecture. Regardless of configuration, iris templates may be encrypted using robust encryption methods and are only allowed to traverse a network in encrypted form.

The present invention provides a variety of advantages over prior authentication systems. For example, computational efficiency is improved by optimizing the entire processing pipeline as a statistical aggregate instead of trying to achieve algorithm perfection at each step of the pipeline. Another important benefit is an improvement in the user experience since the user is allowed to operate under looser constraints with respect to the user's physical positioning in front of the imaging device. Further, the present invention is operational at a range of distances from the seated operator of a computer, computer terminal, laptop, workstation, or a standing operator at an ATM, a point of sale terminal, or similar device.

Additional benefits include security improvements achieved through the continuous or periodic monitoring of user presence and continuous or periodic passive re-authentication. The system is capable of determining if the user is present, may lock the system or revoke user access if the user leaves, and may unlock or re-grant access if the user returns. The face and eyes of someone who sits down and tries unsuccessfully to log in to a computer resource may be captured and stored. Encryption, system authentication, template generation and liveness detection are used to substantially reduce the risk of spoofing or tampering and forensics are captured to record hacking attempts. The system and method support flexible security policies such that the authentication system provides the information to make a multi-level security decision regarding continued access to the computer resource.

Still other advantages, aspects, features, and improvements will be readily apparent from the drawings and the description of the preferred embodiments. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The present invention is a system and method for authenticating a user of a secure system or device such as a computer, point of sale terminal, automatic teller machine, access control system, surveillance system, heavy machinery, weapons systems, gambling systems, medical systems, vehicles, or any other device or system for which continuous user presence monitoring and knowledge of who that user is would be desirable.

Figure 1:
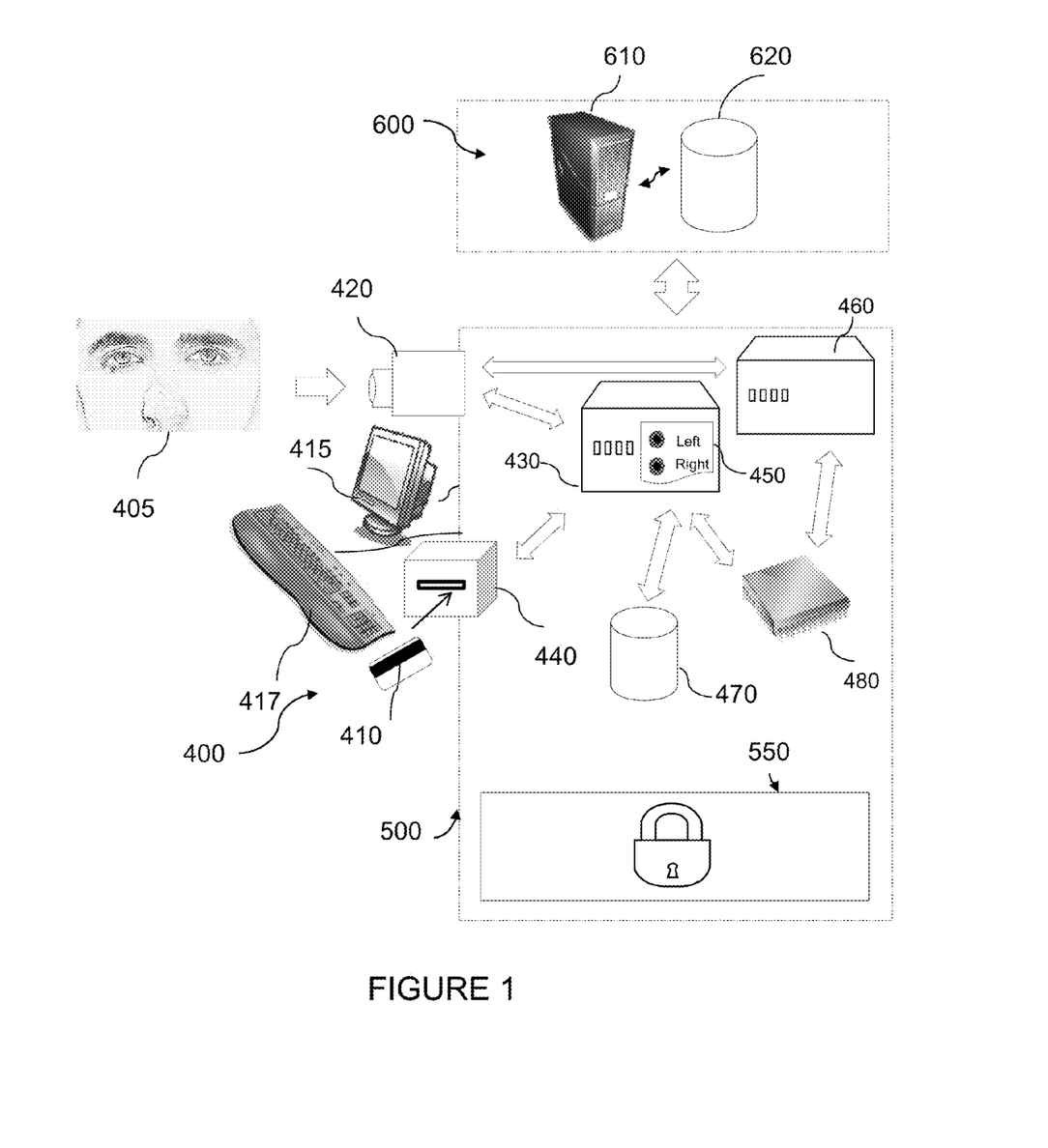
FIG. 1 illustrates a system for authenticating a user to a secure system in accordance with a preferred embodiment of the present invention.

Turning to the figures, FIG. 1 illustrates an authentication system 400 according to one embodiment of the present invention. In this embodiment, system 400 includes an image capture device 420, a computer display 415, an input device 417, an ID card reader 440, a client system 500, a server system 600, and a secure system 550. Image capture device 420, computer display 415, input device 417, and ID card reader 440, may be connected to client system 500 in a wireless or wired fashion, or may each be electronically integrated into the client system.

Client system 500 is a thin client system integrated with secure system 550 but may easily be adapted to other system arrangements. For example, client system 500, server system 600, and secure system 550 may be integrated into one secure device. In device form, an embodiment may also include a tamper resistant casing, device authentication means, output port(s) and may be capable of generating a warning or locking the secure system if tampered with or removed. In an alternative embodiment, each component of authentication system 400 may operate as independent computer devices and communicate through a computer network such as an intranet, extranet, the internet, or any other similar network which enables computers to communicate with each other and share resources and information. Different arrangements of all or some of these elements may be used in various embodiments of the invention.

Server system 600 has a server 610 and a server database 620. Server 600 and server database 610 may be comprised of one or more networked servers and databases. Server system 600 is at least capable of receiving encrypted iris template 450, comparing encrypted iris template 450 to encrypted iris templates of previously enrolled users which reside in server database 620, and communicating the outcome of the iris template comparison to client system 500.

Client system 500 is further comprised of an image generation component 430, a liveliness detection component 460, and a local storage component 470. Image generation component 430 is capable of receiving the user's image from image capture device 420 and is configured to generate a user's iris template 450. Image generation component 430 is implemented using computer programmable instructions performed on central processing unit 480 (CPU), but may alternatively be implemented, for example, using an application specific integrated circuit (ASIC). Iris template 450 preferably contains a left and right iris of user 405, which is unique to user 405. Iris template 450 is compressed and encrypted when generated, which can result in iris template sizes of less than 5 KB. Encryption is performed using PKI, however, other comparable encryption techniques are also contemplated. Compression and encryption of iris template 450 as disclosed results in low bandwidth usage and allows scalability to large numbers of systems (e.g., thousands).

Encrypted iris template 450 is sent by iris generation component 430 to be securely stored on local storage component 470 as well as on server database 620. Only encrypted iris templates are allowed to traverse the network and be stored in local storage component 470 and server database 620, thereby insuring maximum data security. Further, in addition the encrypting iris templates, any other data communicated between authentication system 400 components may also be encrypted during transport. Local storage component 470 may be a database, hard drive, random access memory, or a similar storage medium. In other embodiments, iris template 450 may not be stored locally but instead sent directly to server system 600. In still other embodiments, iris generation component 430 may be implemented on server system 600 instead of client system 500, where images from image capture device 420 are encrypted and sent directly to server system such that the server iris generation component may generate iris template 450 and then compare it to previously enrolled iris templates in server database 610. In addition to iris templates, authentication system 400 is also capable of storing images of user's faces captured by image capture device 420 on local storage component 470 or server database 610 for forensics, logging, and other purposes.

Liveliness detection component 460 is configured to receive images from image capture device 420, where the images are captured at different illuminations and processed to determine if the user's irises are live, thereby minimizing spoof attempts by unauthorized users attempting to authenticate using, for example, a picture. Liveliness detection component 460 is implemented using computer programmable instructions performed on central processing unit 480 (CPU), but may alternatively be implemented using an application specific integrated circuit (ASIC). Liveness detection may be performed, for example, by one or more of (1) altering the level of active illumination and observing the correlated changes of brightness on the eye, (2) altering the pattern of LEDs providing illumination and observing the difference in the specular pattern reflected from the cornea of the eye, and (3) altering the angle of active illumination on succeeding images to change the level of reflectance from within the eye as seen through the pupil, commonly known as "red eye."

Image capture device 420 may be an image sensor, a webcam, a digital still camera, or a video camera mounted to or near the secure system 550 or, alternatively, incorporated into the secure system 550. The system 400 operates the image capture device 420 at a distance from user 405 with little or no effort on the part of user 405. For example, the system 400 may operate at distances of 18-20 inches from user 405. The image capture device may be configured with autofocus and infrared illumination (IR), where the autofocus enables image capture device 420 to continuously maintain the correct focus and the IR enables image capture device 420 to capture a user's face during low light capture, thereby minimizing false positive image captures. The IR also enables image capture device 420 to capture multiple images at different illuminations for use by liveliness detection component 460. Image capture device 420 is capable of sending capture image data to other components of authentication system 400.

Computer display 415 may be an LCD, LED, OLED, CRT, plasma, or other similar computer display or monitor used to render computer generated text and images to user 405. Computer display 415 is configured to display messages, information, and images to user 405. For example, if image capture device 420 is unable to capture an suitable image of user's 405 face, authentication system 400 may prompt user 405 by displaying a message on computer display 415 to look at image capture device 420. Computer display 415 may also be configured to display a user interface for secure system 550. Input device 417 may be a keyboard, keypad, or other conventional computer input device. In other embodiments, computer display 415 and input device 417 may be combined into a touch-screen display which performs the tasks of both computer display 415 and input device 417. Computer display 415 and input device 417 may be connected to client system 500 using standard data connections or integrated directly into client system 500.

ID Card reader 440 may be a magnetic card reader, a smart card reader, a bar code reader, or any other card reader configured to read, analyze, and verify identification card credentials. ID Card 410 may have ID authorization credentials embedded magnetically, in a bar code, in image form, or in other similar forms. Alternatively, ID Card 410 may be a smart card or an integrated circuit card with embedded circuits which store and process the user's iris image template and other user credentials. ID Card reader 440 may be connected to client system 500 using standard data connections or integrated directly into client system 500.

The operation of an embodiment of an authentication system is described with reference to the flow diagram shown in FIG. 2. The process begins when a user activates the authentication system at step 110. This may alternatively be referred to as waking the authentication system. In this embodiment, activation of the authentication system by a user can be set up in a variety of different ways, such as through the insertion of an ID card into an ID card reader, or the typing of a user name, password, PIN or other identifier on an input device. In other embodiments, the authentication system may be activated simply by sitting in front of the authentication system's image capture device or by pressing a key or in some other manner.

In embodiments in which the authentication system is activated by providing user identifying credentials or information to a local client system or device such as the inserting an ID card, providing a user name, or providing other similar user identifying information, the local client system may fetch the user's enrolled iris template from a server at step 120 based on the information provided. The local client system may also fetch other information, such as the user's password, from the server as well as a password desired for a particular system. If no iris template is found on the server based on the user identifying information, the user may be prompted to re-enter the identifying information. To prevent hacking, several failed attempts at fetching the user's enrolled iris template from the server in step 120 may result in a temporary lock of the authentication system or the user's access to the system may be blocked until the failures are reviewed and resolved by a system administrator.

Figure 2:
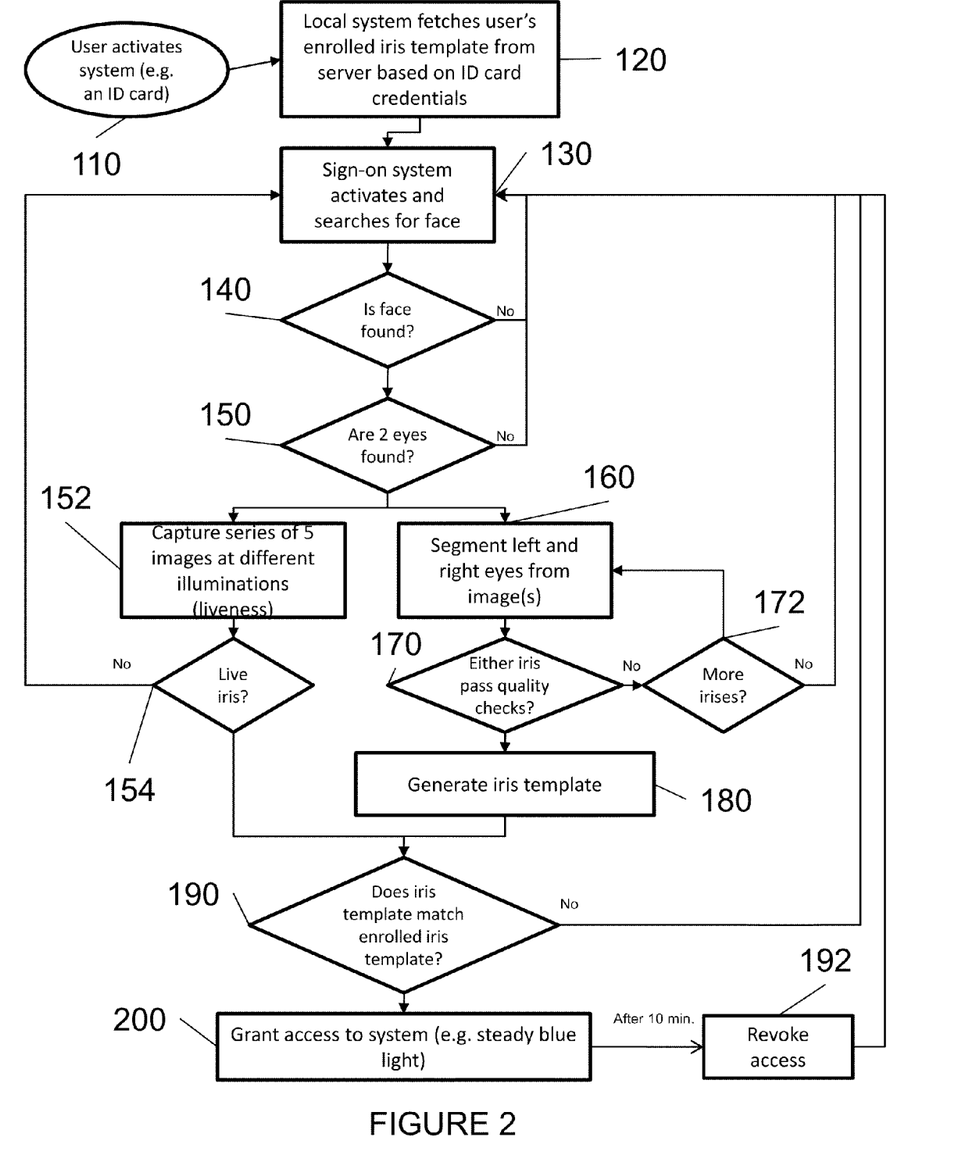
FIG. 2 is a flow diagram of a method for authenticating a user to a secure system in accordance with a preferred embodiment of the present invention.
Figure 2A:
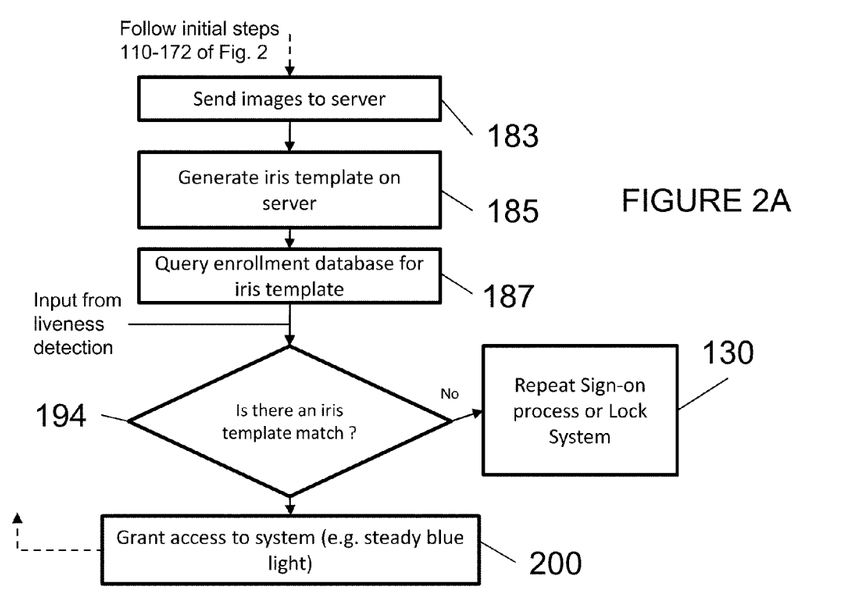
FIG. 2A is a flow diagram detailing a specific variation of the method of FIG. 2.
Figure 2B:
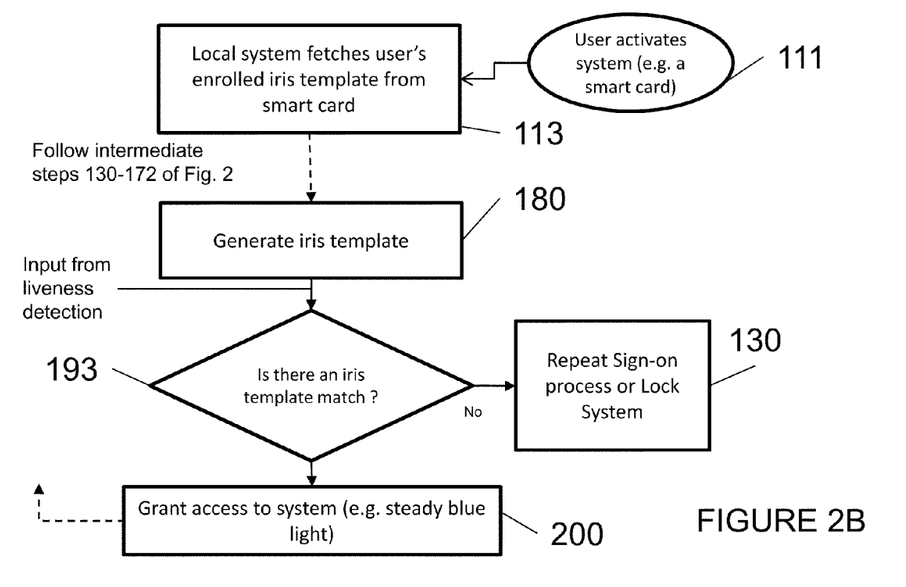
FIG. 2B is a flow diagram detailing an alternative specific variation of the method of FIG. 2.

Referring to FIG. 2B, in other embodiments, the user activates the authentication system by entering a smart ID card into a card reader, as shown in step 111, where the enrolled iris template and other information are retrieved from the smart ID card once inserted into the card reader, as shown in step 113, and later compared to generated user iris template, as shown in step 193. Alternatively, other types of ID cards capable of storing the iris template may be used as RFID, bar codes, etc. All data stored, generated, or retrieved at any step from any system component or device within the authentication system may be encrypted, thus insuring that only encrypted data traverses the network.

Next, referring again to FIG. 2, the sign-on system activates and searches for a face via the image capture device at step 130. A face may be found, for example, by finding ratios of circles in the image. In searching for a face, the image capture device securely captures an image of the user's face and the authentication system determines, at step 140, whether a face was found. If not, the system returns to step 130 and again searches for a face. This may be repeated a designated number of times or be repeated for a period of time such that the system returns to an inactive mode if no face is found within the set period of time or number of attempts. The system also may be set up to provide the user with a message of some type indicating that the user, for example, needs to look at the image capture device or re-position themselves in front of the image capture device to achieve activation. The image capture device may be equipped with an identifier, such as a blinking light, to assist the user in locating and looking at the image capture device.

If a face is found at step 140, the authentication system determines whether two eyes are found in the face in step 150. The face and eye or eyes may be found simultaneously. It is preferred if two eyes can be found, but two eyes are not necessary as the present invention may be used if only one eye is found. Face finding step 140 and eye finding step 150 may quickly generate multiple real and false positives, where the false positives are discarded by subsequent steps of the authentication system, thereby eliminating the generation of any actual false positives and the real positives are used to determine whether to grant the user access. This technique allows the authentication system to operate under looser constraints with respect to the positioning of the user. If no eyes are found in step 150, the system returns to step 130 and searches for a face. While it is preferred to find two eyes, the invention may also be arranged to continue as long as one eye is found. If eyes were not found, the authentication system may display a message on a computer display to the user advising the user to look at the image capture device or to re-position in front of the image capture device. Alternative embodiments of the invention may bypass the step of finding a face and find the eye or eyes directly.

If two eyes are found in step 150, two actions may be undertaken by the authentication system simultaneously. One the one hand, the authentication system captures a series of images, for example five images, at different illuminations at step 152. The variance in illumination may be achieved by using IR. The authentication system then determines at step 154 whether the images are taken from a live iris, as opposed to, for example, a picture.

On the other hand, the authentication system segments the left and right eyes from the image at step 160. The authentication system then determines whether either iris passes quality checks at step 170. Image quality may depend upon image focus, iris signal-to-noise ratio, pixels across iris, illumination specularities and digital image artifacts such as motion tear. Additionally, preliminary image quality metrics may be employed to weed out bad images earlier in the process. If neither iris passes the quality checks at step 170, the authentication system proceeds to step 172 at which it determines whether there are more irises in the image. If yes, the authentication system returns to step 160. If no, the authentication system returns to step 130 and again searches for a face. If either or both irises pass the quality checks in step 170, the authentication system proceeds to step 180 and generates an iris templates from an iris in the capture image and sends the template to the server. In other embodiments, both irises may be required to pass quality checks in order to proceed to step 180. In this embodiment, the time for completing the face searching 130, finding 140 and 150, segmenting 150, quality checking 170, and iris template generation 180 steps is 1-2 seconds, which is faster than a typical user can type in a password or PIN.

If a live iris was found at step 154 and either iris passes quality checks in step 170, the user's encrypted iris template is generated from the images in step 180 and compared in step 190 to the user's enrolled iris template fetched from the server in step 120. In other embodiments, as illustrated by FIG. 2A, the user's iris template may be generated on the server as shown in step 185. To this end, images captured in step 130 are encrypted and sent to the server in step 183 such that the user's encrypted iris template may be generated in step 185, and compared to the enrollment database in steps 187 and 194. In embodiments where the comparison of the user's iris template to a database of enrolled users occurs on the server, the comparisons may be made to databases of prohibited irises as well as to enrolled irises. As mentioned previously, the iris template generated in step 180 is encrypted when generated insuring that only encrypted data is transmitted within the authentication system. Further, the iris template generated in step 180 is compact, allowing the authentication system to be scaled to a wide range of systems of varying capability. As disclosed in reference to FIG. 1, encryption is performed using PKI, however, other comparable encryption techniques are also contemplated.

Referring back to FIG. 2, If a match is not found in step 190, authentication is canceled and the system returns to step 130. If a match is found in step 190, the user is granted access to a secure system at step 200. The authentication system may indicate that the user was granted access by illuminating a blue access light, displaying a message to a user, or using another indicator. After a predetermined period of time, such as ten minutes, or after a shorter or longer period of inactivity, user access may be revoked, as shown in step 192, and the system returns to step 130 to repeat the sign-on sequence.

This embodiment may optionally continuously or periodically re-authenticate the user after access is granted to the secure system. Re-authentication is performed by repeating steps 130 through 200 illustrated in FIGS. 2 and 3. Re-authentication may be performed silently on the users so the user is unaware that re-authentication is being performed. If this is not effective, the user may be prompted to look at the imaging device for 1-2 seconds such that a proper capture of the user's face may be performed.

In the above process, each step in which the system returns to an earlier step can be set with a threshold such that the system will be locked and/or the user will receive a message if authentication or re-authentication is not accomplished after a certain number of attempts or after a certain period of time elapses.

Figure 3:
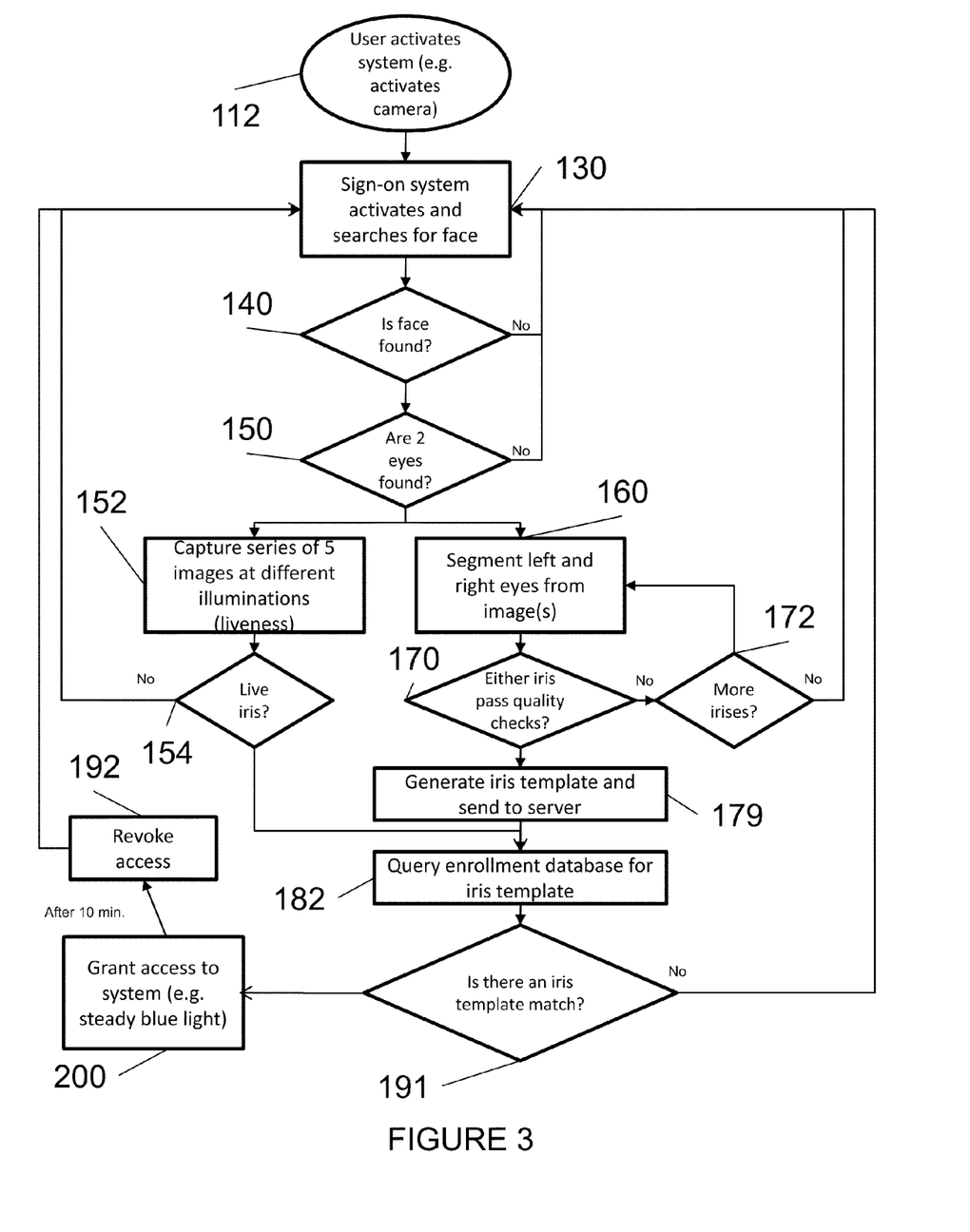
FIG. 3 is a flow diagram of an alternative method for authenticating a user to a secure system.

In this particular embodiment the local client system fetches the user's enrolled iris template from the server. Due to this, the comparison of the template of the captured iris to the template of the enrolled iris may be performed locally to determine whether the template of the captured iris matches the template of the enrolled iris for that particular user. In other embodiments, that comparison may be performed at the server. In still other embodiments, as illustrated by FIG. 3, the initial fetching step may be forgone, as shown by step 112, and instead the user's iris template may be verified by steps 130 through 172 and then generated and sent to a server in step 179 and compared to a server enrollment database in steps 182 and 191. Otherwise, the steps of FIG. 3, namely steps 130, 140, 150, 152, 154, 160, 170, 172, 192, and 200 are identical to those described in FIG. 2.

Figure 4:
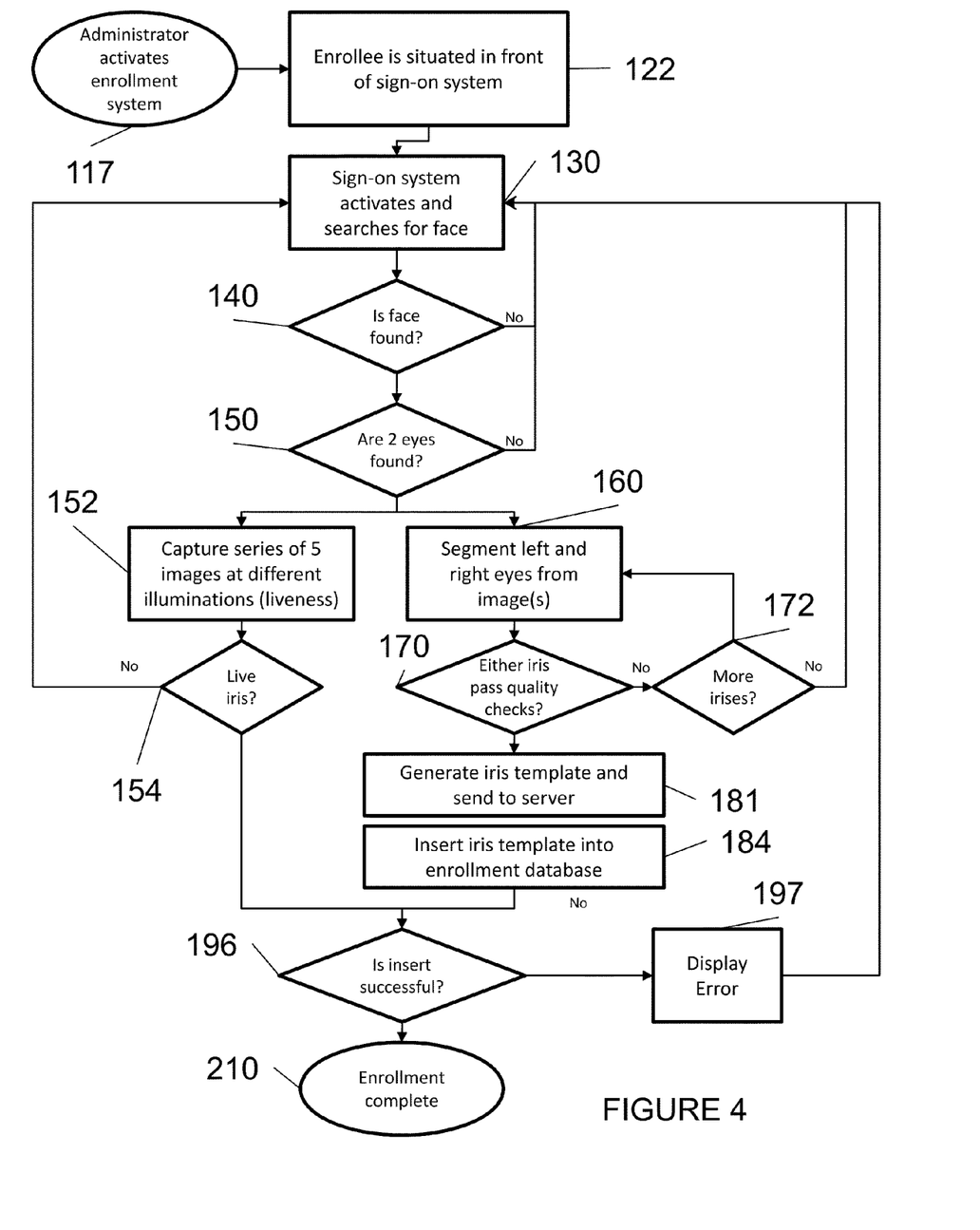
FIG. 4 is a flow diagram of a method for enrolling a user to authenticate to a secure system.

A user's enrollment template may be created using an enrollment system, a system similar in likeness to those shown in FIGS. 2 and 3, and which is illustrated in FIG. 4. In this embodiment, an administrator activates the enrollment system by authenticating to the enrollment system as an authorized administrator as shown in step 117. In step 122, an enrollee, and future authorization system user, is situated in front of the sign-on system where the sign-on system activates and searches for the enrollee's face. Intermediate steps 130 through 172 are the same as described above in reference to FIG. 2. Referring again to FIG. 4, once the enrollee's iris has been determined as live in step 154 and the iris passes quality checks in 170, the enrollment system generates an encrypted enrollee iris template in step 181 which is then sent to the server in step 181 and stored in the enrollment database 184. This same database is later queried by the authentication system to verify user enrollment. If the enrollee's iris template is successfully enrolled into the enrollment database, step 196, status of successful enrollment is displayed to the administrator and enrollee as shown in step 210. If not, an error message is displayed and the enrollment sequence begins again at step 130. In other embodiments, Administrator activation, step 110, may occur later in the enrollment process, for example, after the enrollee's iris template has been generated and prior to it being enrolled.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for authenticating a user to a secure system, comprising:
   capturing with an image capture device an image comprising an eye of a user;
   generating with a processing unit an encrypted iris template from the image;
   storing said encrypted iris template in a storage;
   performing with a processing unit liveness verification on an eye of the user;
   comparing with a processing unit the generated encrypted iris template to an enrolled iris template;
   granting the user access to the secure system if the generated encrypted iris template matches the enrolled iris template and if the liveness verification demonstrates the eye of the user is live;
   denying the user access to the secure system if the generated encrypted iris template does not match the enrolled iris template; and
   denying the user access to the secure system if the liveness verification demonstrates the eye of the user;
   wherein generating the iris template from the first image further comprises:
   identifying the user's face in the image;
   identifying the user's eyes in the image;
   if no face or eyes are identified in the image, returning to the capturing step;
   segmenting left and right eyes from the image;
   performing a quality check on irises of the segmented eyes;
   if one or both irises pass the quality check, generating the iris template; and
   if each of the irises fails the quality check, determining whether more irises are present in the image;
   if more irises are present in the image, performing a quality check on the additional irises; and
   if no more irises are present in the image, returning to the capturing of an image.

2. The method of claim 1, further comprising:
   automatically re-authenticating the user after access is granted.

3. The method of claim 2, wherein automatically re-authenticating the user after access is granted comprises re-authenticating the user after expiration of a pre-determined amount of time.

4. The method of claim 3, wherein re-authenticating the user is performed passively on the user.

5. The method of claim 3, re-authenticating the user further comprising:
   capturing a subsequent image comprising an eye of the user;
   generating a subsequent iris template from the subsequent image;
   performing subsequent liveness verification on the user;
   maintaining access to the secure system if the subsequent iris template matches the enrolled iris template and if the subsequent liveness verification demonstrates the eye of the user is live;
   denying the user access to the secure system if the subsequent iris template does not match the enrolled iris template; and
   denying the user access to the secure system if the subsequent liveness verification demonstrates the user is not live.

6. The method of claim 1, wherein performing liveness verification further comprises:
   capturing a series of images of an eye of the user at different illuminations;
   determining whether the series of images demonstrate a live iris;
   denying access to the secure system if the series of images do not demonstrate a live iris; and
   granting access to the secure system if the series of images demonstrate a live iris.

7. The method of claim 6, wherein generating an iris template from the image is performed only if the series of images demonstrates a live iris.

8. The method of claim 1, wherein generating an iris template is performed on a server system.

9. The method of claim 1, wherein generating an iris template is performed on a client system.

10. The method of claim 1, wherein returning to the capturing step if no eyes are identified in the image further comprises displaying a message to a user.

11. The method of claim 1, further comprising activating an iris authentication system.

12. The method of claim 1, further comprising requiring the user to provide additional identifying credentials.

13. The method of claim 1, further comprising requiring the user to swipe a smart identification card, the smart identification card securely storing and providing the at least one enrolled iris template.

14. The method of claim 1, further comprising repeating the granting a user access to a secure system after the occurrence of a predetermined event.

15. The method of claim 14, wherein the occurrence of a predetermined event comprises the expiration of a predetermined period of time.

16. The method of claim 1, wherein the method of authenticating a user is limited to a predetermined number of consecutive failed attempts, after which access to the secure system is temporarily locked.

* * * * *